R. WOLF.
MACHINE FOR FORMING LOAVES FROM A MASS OF DOUGH.
APPLICATION FILED APR. 19, 1913.

1,126,606.

Patented Jan. 26, 1915.

WITNESSES:
H. W. Meade
S. W. Atherton

INVENTOR
Rudolph Wolf
BY
A. M. Brooster
ATTORNEY

R. WOLF.
MACHINE FOR FORMING LOAVES FROM A MASS OF DOUGH.
APPLICATION FILED APR. 19, 1913.

1,126,606.

Patented Jan. 26, 1915.
4 SHEETS—SHEET 2.

WITNESSES:

INVENTOR
Rudolph Wolf
BY
ATTORNEY

R. WOLF.
MACHINE FOR FORMING LOAVES FROM A MASS OF DOUGH.
APPLICATION FILED APR. 19, 1913.

1,126,606.

Patented Jan. 26, 1915.

WITNESSES:

INVENTOR
Rudolph Wolf
BY
ATTORNEY

R. WOLF.
MACHINE FOR FORMING LOAVES FROM A MASS OF DOUGH.
APPLICATION FILED APR. 19, 1913.

1,126,606.

Patented Jan. 26, 1915.
4 SHEETS—SHEET 4.

WITNESSES:
J.H.W. Meade
S.W. Atherton

INVENTOR
Rudolph Wolf
BY
N.M. Wooster
ATTORNEY

UNITED STATES PATENT OFFICE.

RUDOLPH WOLF, OF BRIDGEPORT, CONNECTICUT.

MACHINE FOR FORMING LOAVES FROM A MASS OF DOUGH.

1,126,606.   Specification of Letters Patent.   Patented Jan. 26, 1915.

Application filed April 19, 1913. Serial No. 762,444.

*To all whom it may concern:*

Be it known that I, RUDOLPH WOLF, a citizen of the United States, residing at Bridgeport, county of Fairfield, State of Connecticut, have invented an Improvement in Machines for Forming Loaves from a Mass of Dough, of which the following is a specification.

This invention relates to the art of bread making and has for its general object to provide a machine which will separate measured portions of dough from a mass and will mold such portions into the form of loaves ready for baking.

A more particular object of the invention is to provide a single combined machine capable of performing the foregoing operations continuously or without interruption between the several steps.

Another object of the invention is to provide improved mechanism for molding the portions of dough separated from the mass into loaves ready for baking.

With these and other objects in view I have devised the novel machine which I will now describe, reference being had to the accompanying drawings, in which.

15 denotes the machine frame which is suitably constructed to afford the necessary supports, bearings and guides for the various parts hereinafter described. The main operating mechanism comprises shafts 16, 17 and 18 journaled in the frame 15. The shaft 16 is provided with a belt pulley 19 adapted to receive a suitable driving belt (not shown) by which said shaft may be driven from any suitable source of power. Said shaft 16 is further provided with a gear 20 which meshes with a gear 21 on the shaft 17 and through which gears said shaft 17 receives its motion from the shaft 16. The shaft 17 is provided with a second gear 22 which meshes with a gear 23 on the shaft 18, whereby said shaft 18 is driven from the shaft 17.

35 denotes a ratchet wheel mounted to rotate on a stud 36 projecting from the frame. The ratchet wheel 35 is intermittently rotated by means of a pawl 37 carried by an arm 38 pivoted on the stud 36 and connected by a rod 39 with a crank arm 40 on the shaft 18. The connection between the rod 39 and the arm 40 is by means of a slide 41 to which said rod is pivoted, said slide being movable in guideways in the arm 40 by means of an adjusting screw 42. By operating the adjusting screw 42 the slide 41 may be moved inwardly and outwardly upon the arm 40, thereby adjusting the stroke of the pawl 37 and varying the amount of rotation given to the ratchet wheel 35 at each rotation of the shaft 18.

43 denotes a gear secured to the ratchet wheel 35 and meshing with a gear 44 on a shaft 72 (see Figs. 1, 2 and 3) journaled in the machine frame and from which shaft the various parts of the dough feeding mechanism are operated, as will presently be more fully described.

24 (Figs. 1 and 3) denotes a hopper which receives the raw dough from which the loaves are made. Said hopper 24 consists of downwardly converging front and rear end walls 25 and substantially vertical outer side walls 26.

27 denotes downwardly converging inner side walls of the hopper 24, said walls 27 comprising swinging plates pivoted or hinged at their upper ends, as at 28, to the walls 25.

29 denotes adjusting screws passing through the walls 26, and engaging the hinged walls 27. By turning the screws 29 the walls or plates 27 may be swung on their pivots, thereby adjusting the width of the opening at the bottom of the hopper 24.

34 denotes rollers journaled in the plates 27, and freely rotatable therein, the function of said rollers being to facilitate the downward passage of the dough through the hopper.

45 denotes an apron, preferably of sheet metal, arranged immediately below the bottom of the hopper 24 and in front thereof, and 46 a similar apron similarly located at the rear of said hopper. The apron 45 is carried by rollers 47 and 48, the former being carried by a shaft 49 journaled in the machine frame, and the latter being suitably journaled in a slide 50 guided for horizontal movement on the machine frame and movable thereon, to adjust the tension of the apron 45, by means of an adjusting screw 51. The apron 45 is driven intermittently in the direction of the arrow on Fig. 2 by means of a sprocket wheel 52 (see Fig. 3) connected by a chain 53 with a sprocket wheel 54 on the shaft 72. The apron 46 is carried by rollers 55 and 56, the former being secured to a shaft 57 journaled in the machine frame and the latter being journaled in a slide 58 movable on the machine frame, to adjust the tension of the apron 46, by means of an adjusting screw 59. The apron 46 is intermittently driven in the direction of the arrow on Fig. 2 by means of a gear 60 (Fig. 1) on the shaft 57 which meshes with the gear 44.

As will now be understood, the dough in the hopper 24 passes freely downward therein and is intermittently drawn from the open lower end thereof by means of the portions of the aprons 45 and 46 passing over the rollers 47 and 56 which are located immediately adjacent said open bottom. The amount of dough drawn from the hopper at each rotation of the shaft 18 is controlled by the opening in the bottom of the hopper, which is determined by the adjustment of the swinging plates 27, and by the stroke of the pawl 37, which is determined by the adjustment of the slide 41. While either of these adjustments may serve to control the quantity of dough delivered at each operation, it has been found that by the combination of the two this quantity can be determined with great precision.

61 denotes flour hoppers arranged immediately adjacent the front and rear walls 25 of the dough hopper 24 and having open lower ends located immediately adjacent the open lower end of the dough hopper and also immediately adjacent the aprons 45 and 46. As the aprons 45 and 46 are moved past the lower ends of the flour hoppers 61 they are given a light coating of flour from said hoppers which prevents the dough from sticking thereto.

63 denotes a third apron or conveyer, also preferably of sheet metal, carried by rollers 64 and 65. The roller 64 is journaled in a slide 66 adjustable on the machine frame, to control the tension of the apron 63, by means of an adjusting screw 67. The roller 65 is mounted on a shaft 68 journaled in the machine frame and intermittently rotated to drive the apron 63 in the direction of the arrow on Fig. 2 by means of a sprocket wheel 69 (Fig. 3) connected by a chain 70 with a second sprocket wheel (not shown but immediately behind the sprocket wheel 54 in Fig. 3) on the shaft 72. The upper portion of the apron 63 is supported at mid-length by a roller 71 (Fig. 2) on the shaft 72.

Figure 2:
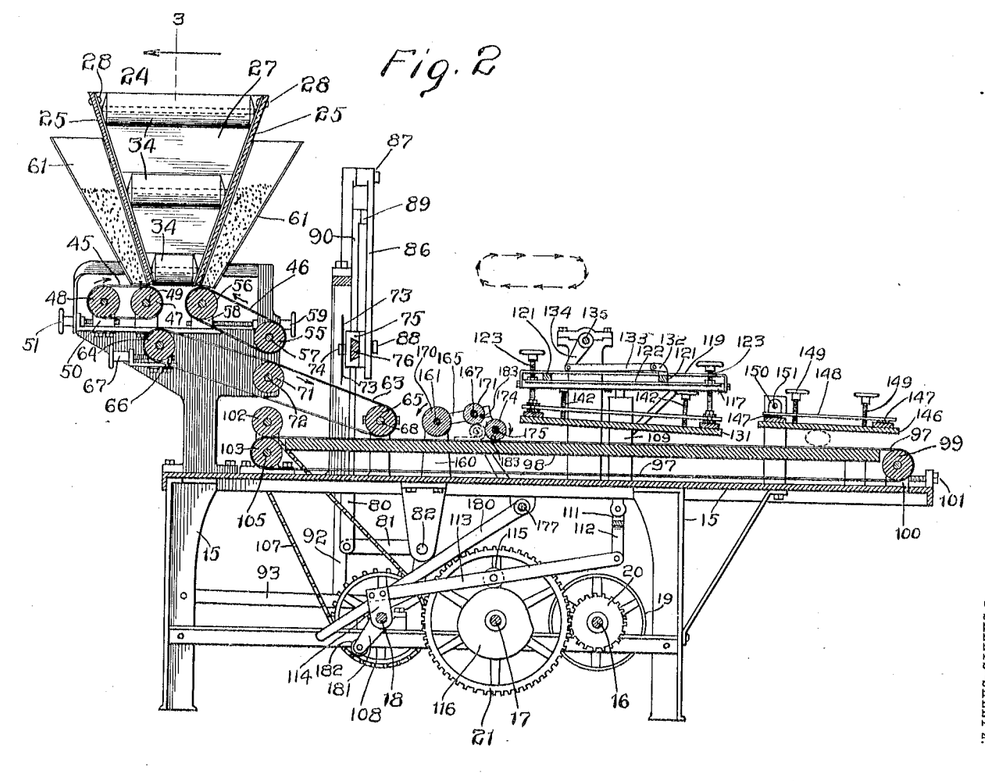
Fig. 2 is a central longitudinal vertical section thereof.

The dough drawn from the hopper 24 by the aprons 45 and 56 passes downwardly upon the upper portion of the apron 63 and is conveyed thereby downwardly and toward the right in Fig. 2 to the cutting mechanism, which will presently be described. This operation is assisted by the lower portion of the apron 46 which engages the upper surface of the dough on the apron 63 and also serves to flatten said dough down somewhat upon the apron 63, if necessary, in order to present the same in convenient form to the cutting mechanism.

73 denotes a cutter, preferably in the form of a circular metallic disk having a circumferential cutting edge. Said cutter is preferably pivotally secured, as upon a stud 74, to a slide 75 movable longitudinally upon a lever 76 which preferably has a dovetailed engagement with said slide. The lever 76 is pivoted as at 77 to the machine frame at a point above and at one side of the upper portion of the apron 63. Movement of lever 76 upon its pivot causes the cutter 73 to be moved toward and from the apron 63, while movement of the slide 75 longitudinally on the lever 76 causes said cutter to be moved across said apron.

Figures 3, 9:
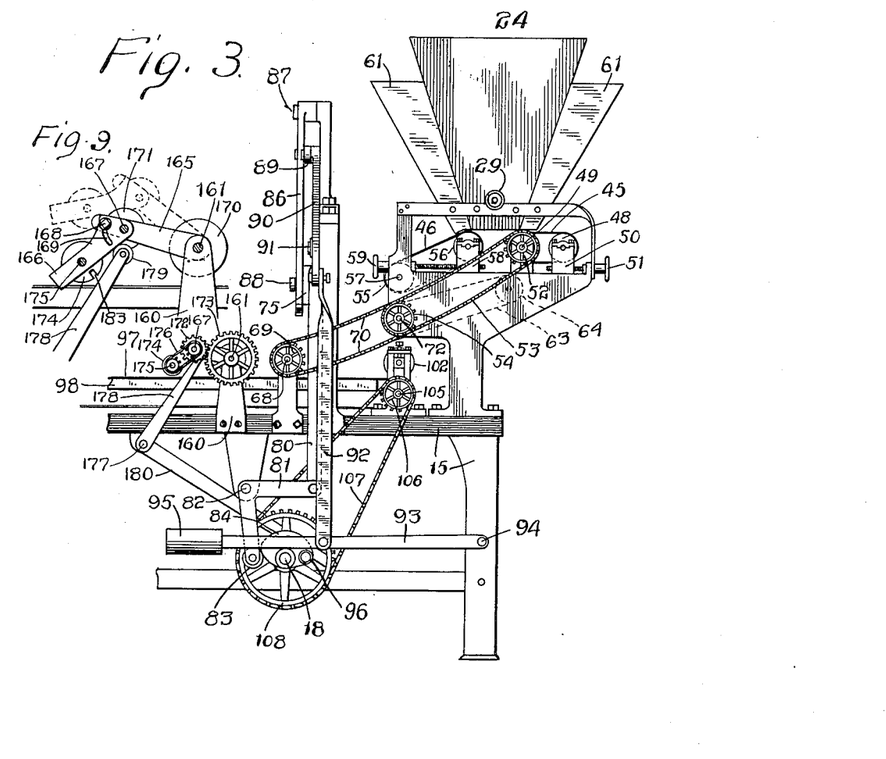
Fig. 3 is an elevation of that end of the machine shown at the left in Fig. 1, as viewed from the opposite side.
Fig. 9 is an enlarged side elevation of the primary molding mechanism.

80 denotes a link engaging at its upper end the free end of the lever 76 and pivoted at its lower end to one arm of a bell crank lever 81 which is pivoted at 82 to the machine frame and has a second arm carrying a cam roller 83 which coöperates with a cam 84 on the shaft 18 (see Fig. 3). Engagement of the high portion of the cam 84 with the cam roller 83 causes the link 80 to be depressed to lower the cutter 73 toward the apron 63, said link and cutter being raised when permitted by the cam 84 by means of a suitable spring (not shown).

The mechanism for moving the slide 75 on the lever 76 is as follows: 86 denotes a lever pivoted at 87 to the machine frame at a point above the lever 76 and having a forked lower end embracing a stud 88 projecting from the slide 75. The lever 86 is oscillated on its pivot 87 by a link 89 pivoted at one end to said lever and at the other end to one arm of a bell crank lever 90, pivoted at 91 to the machine frame. The other arm of the lever 90 is pivoted to a link 92 connected at its lower end (see Fig. 3) to a lever 93, fulcrumed at 94 to the machine frame. The lever 93 carries a weight 95, which causes said lever normally to rest upon the hub of the cam 84, as shown in Fig. 3. 96 denotes a stud or roller projecting laterally from the face of the cam 84 and adapted, as said cam rotates, to engage and lift the lever 93, thereby through the link 92, lever 90, link 89 and lever 86, moving the slide 75 and cutter 73 across the apron 63. When the stud or roller 96 passes out of engagement with the lever 93, the weight 95 causes said lever to return to its normal position.

The relative arrangement of the two mechanisms last described is such as to cause the cutter 73 to be lowered upon the apron 63 and then move thereacross, thereby severing that portion of the dough which has been carried by the apron 63 beyond said cutter from the mass on said apron, after which said cutter is returned to its initial position.

The portion of dough severed by the cutter 73 falls from the apron 63 upon a fourth apron or conveyer 97 (see particularly Fig. 2) which is preferably composed of canvas or similar textile material, the upper portion of said apron being supported by a table 98 mounted on the machine frame. At one end the apron 97 passes about a roller 99 journaled in a slide 100 movable on the machine frame, to adjust the tension of said apron, by means of an adjusting screw 101. At its opposite end said apron 97 passes between feed rollers 102 and 103 and about the latter. Said feed rollers are preferably connected by gears 104 (see Fig. 1) while the roller 103 is fixed upon a shaft 105, which carries a sprocket 106 (see Fig. 3) connected by a chain 107 with a sprocket wheel 108 on the shaft 18. By these connections the apron 97 is continuously driven from the shaft 18 in the direction of the arrow on Fig. 2.

Above the apron 97, and coöperating therewith to form into loaves the portions or masses of dough on said apron, are molding mechanisms which will now be described. These mechanisms are, for convenience of description, designated respectively as the primary molding mechanism and the secondary molding mechanism, in accordance with the order in which they operate upon the dough.

The primary molding mechanism is most clearly shown in Figs. 1, 2, 3 and 9. 160 denotes brackets secured to the frame 15 and in which is journaled a shaft 161 carrying a sprocket 162 connected by a chain 163 with a sprocket 164 on the shaft 17 and by which said shaft 161 is continuously rotated from said shaft 17. Mounted to swing loosely on the shaft 161 is a pair of angularly adjustable arms comprising inner sections 165, pivoted on said shaft, and outer sections 166, pivoted on rod or shaft 167 connecting the outer ends of said inner sections, said outer sections being held in adjusted angular position on said rod or shaft by means of clamp screws 168 carried by the sections 165 and passing through segmental slots 169 in the sections 166. 170 denotes a roller fixed to the shaft 161 and continuously rotated thereby. 171 denotes a second roller mounted to rotate on the rod of shaft 167 and provided with a gear 172 which meshes with a gear 173 on the shaft 161, whereby said roller 171 is continuously rotated from said shaft 161 in a direction opposite to that of the roller 170. 174 denotes a third roller mounted to rotate on a rod or shaft 175 carried by the outer sections 166 of the angularly adjustable swinging arms, said roller being connected by a belt or sprocket chain 176 with the roller 171, whereby said rollers are driven in unison in the same direction. 177 denotes a rock shaft journaled in the machine frame and having rigidly secured thereto arms 178 carrying at their upper ends rollers 179 which engage the outer sections 166 of the swinging arms. 180 denotes a third arm secured to the shaft 177 and normally resting at its lower end on the shaft 18. 181 denotes an arm on the shaft 18 carrying at its end a roller 182 adapted, as the shaft 18 is rotated, periodically to engage and lift the end of the arm 180.

The dough from the apron 63 is received in a substantially flat sheet upon the apron 97 and is carried thereby beneath the roller 161 and into engagement with the roller 174, which normally rests upon said apron. As shown in Fig. 2, the roller 170 rotates in a counter-clockwise direction, while the rollers 171 and 174 rotate in a clockwise direction, the movement of the upper portion of the apron 97 being from left to right. Engagement of the roller 174, which rotates in opposition to the direction of movement of the apron 97, with the end of the sheet of dough on said apron causes said end to be turned upwardly, the roller 170 preventing the dough from being forced backwardly. As the end of the sheet is turned upwardly it is engaged by the roller 171 which further turns the same, causing the sheet of dough to be rolled up as shown in dotted lines in Fig. 2. After the complete roll of dough has been formed, engagement of the roller 182 on the arm 181 with the arm 180 causes the shaft 177 to be rocked, so that the roller 179 on the arm 178 lifts the arms 165, 166 and rollers 171 and 174, releasing the roll of dough and permitting the apron 97 to carry the same beneath and beyond the roller 174, after which the roller 182 passes out of engagement with the arm 180 and permits the rollers 171 and 174 to return to their normal position.

The angular adjustment of the arms 165, 166 is for the purpose of permitting larger or smaller loaves to be rolled, the height of the roller 171 above the apron 97 being governed by the adjustment of the sections of these arms. In order to facilitate the rolling of the dough the rollers 171 and 174 are preferably formed with grooves 183.

From the primary molding mechanism just described the rolls of dough are carried by the apron 97 to the secondary molding mechanism, which is shown most clearly in Figs. 1, 2 and 4 to 8. 109 denotes upright guides on opposite sides of the machine frame in which are mounted for vertical movement slides 110. Said slides are pivoted at their lower ends to the arms of a yoke 111 having a downwardly extending arm 112 (see Fig. 2) pivoted at its lower end to an arm 113. Said arm 113 is rigidly secured to a rocker 114 loosely mounted on the shaft 18 and carries a roller 115 which engages the edge of a cam 116 fast on the shaft 17, said roller being held in engagement with said cam by the weight of the parts. Rotation of the shaft 17 therefore causes the slides 110 to be reciprocated vertically in the guides 109. At their upper ends the slides 110 carry a frame composed of a pair of longitudinal bars 117 secured to said slides respectively and connected by a cross bar 118. Secured to the ends of the bars 117 are the downturned ends of retaining straps 119, said straps and bars forming between them guideways for rollers 120. The rollers 120 are carried at the ends of cross bars 121 which are connected to form a rigid frame by longitudinal bars 122. 123 denotes adjusting screws which pass through threaded openings in the bars 122 adjacent the opposite ends thereof and are held in adjusted position in said openings by lock nuts 124. Said adjusting screws pass through openings in bars 125 arranged at right angles to the bars 122, said screws having heads 126 which engage the under sides of said bar 125, thereby connecting them to the bars 122. 127 denotes bars parallel to and arranged immediately beneath the bars 125. The bars 127 are connected with the bars 125 by bolts 128 and are spaced therefrom, as clearly shown in Fig. 6, said bars 127 engaging the under sides of the heads 126. Connected with the bars 127 by means of bolts 129 passing through space blocks 130 is the molding board 131, which is located a short distance above the apron 97.

Figure 1:
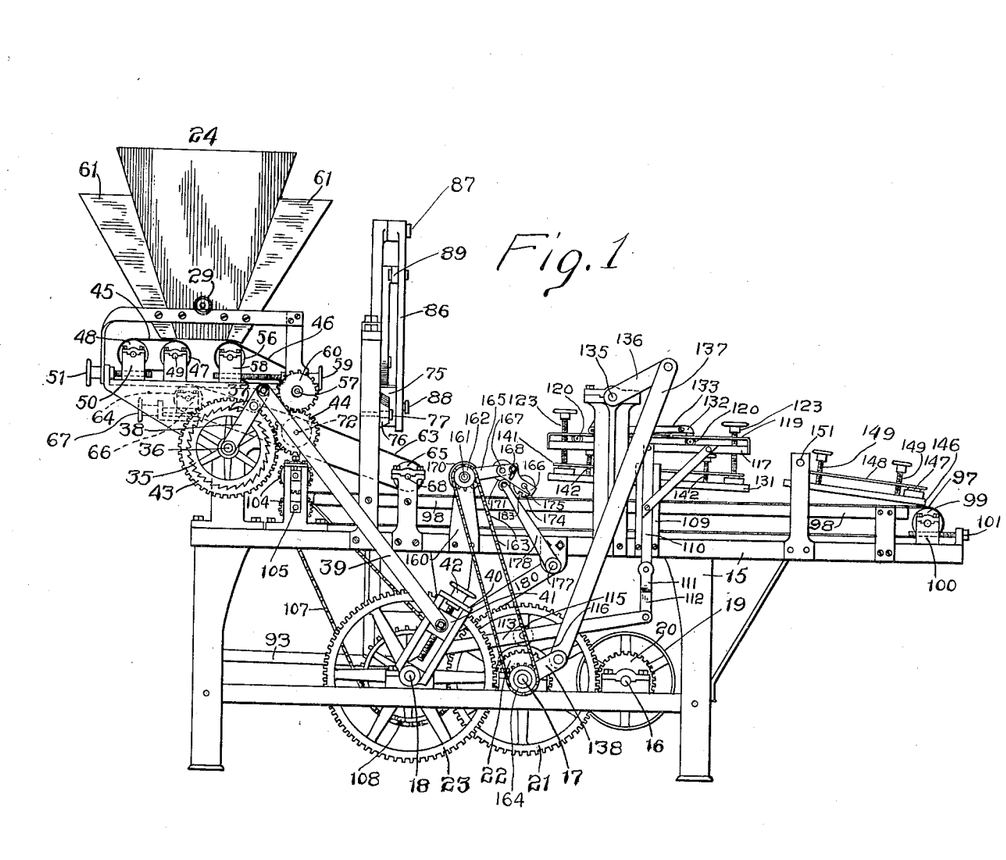
Figure 1 is a side elevation of the complete machine.
Figures 4, 5, 6, 7, 8:
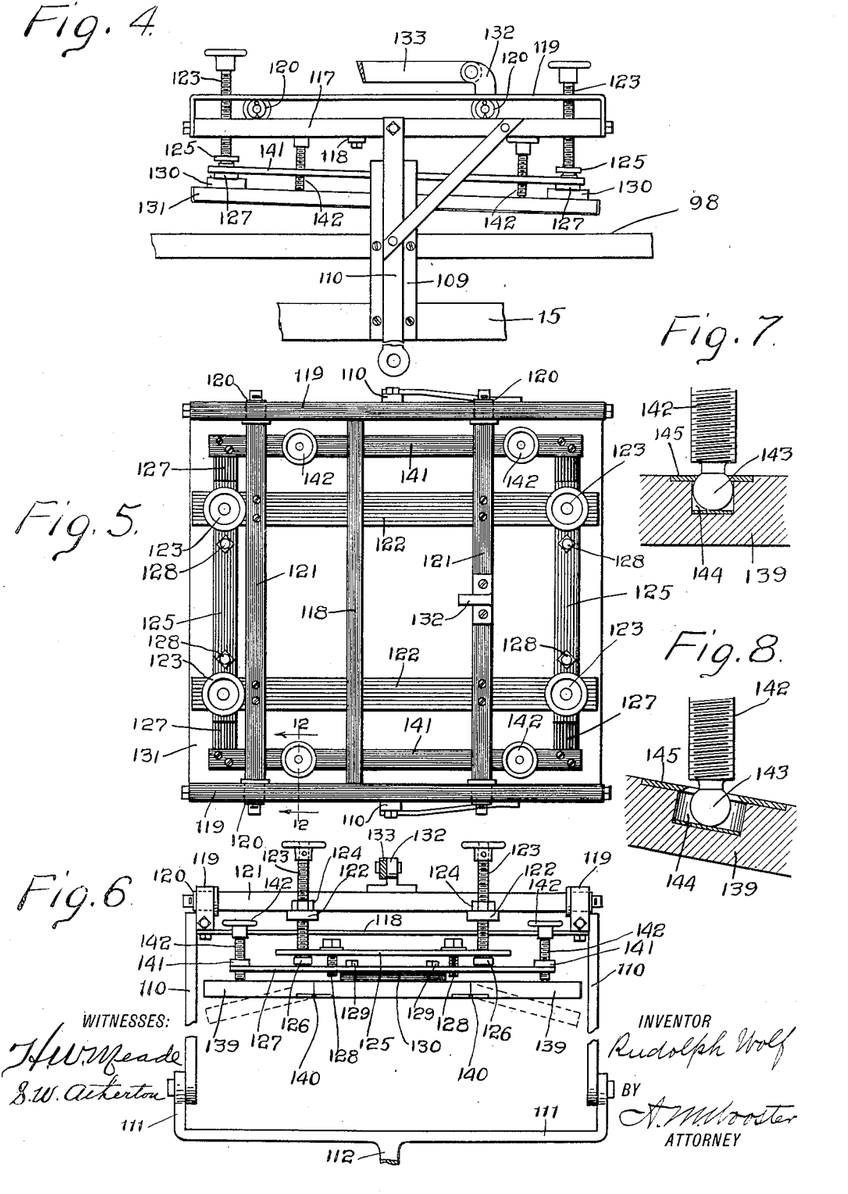
Figs. 4, 5 and 6 are respectively a side elevation, a plan view, and an end elevation of the secondary molding mechanism.
Figs. 7 and 8 are enlarged detail sectional views, taken at right angles to each other, of the means for adjusting the form of the molding board.

From the foregoing it will be seen that the frame composed of the bars 117 and 118 is supported and guided for vertical movement by the slides 110, that the frame composed of the bars 121 and 122 is supported and guided for horizontal movement on said first-named frame, and that the molding board 131 is adjustably supported from said last-named frame. There being an adjusting screw 123 adjacent each of the four corners of the frame 121, 122 and molding board 131, said molding board can be adjusted in any desired manner with respect to a horizontal plane. Preferably the adjustment will be substantially as shown in Figs. 1, 2 and 4, with the right end of said board, as shown in said figures, somewhat closer to the apron 97 than the left end thereof.

For moving the frame 121, 122 horizontally on the frame 117, 118, the following mechanism is provided: Secured to one of the bars 121 is a bracket 132 to which is pivoted one end of a link 133, the opposite end of which is pivoted to an arm 134 (see Fig. 2) on a rock shaft 135 journaled in the machine frame above the molding board and its supporting frames. 136 (Fig. 1) denotes a second arm on the rock shaft 135 connected by a link 137 with a crank arm 138 on the shaft 17. Rotation of the shaft 17, through the arm 138, link 137, arm 136, rock shaft 135, arm 134, and link 133, causes the frame 121, 122 to be moved horizontally on the frame 117, 118, the rollers 120 moving in the guideway formed by the bars 117 and straps 119.

As a result of the combined vertical and horizontal movements above described, the molding board 131 is caused to move in a substantially oval path, as indicated by the dotted arrows immediately above this portion of Fig. 2. That is to say, said molding board when in or adjacent its lowermost position, or relatively near the apron 97, moves toward the left or in opposition to the movement of said apron, and moves toward the right only when elevated or relatively removed from said apron. The effect of the combined movement of the apron 97 and molding board 131 upon a mass or roll of dough upon said apron and carried thereby toward the right, is to cause said mass to be successively engaged by said molding board and further rolled up or molded thereby into the form of a loaf. The adjustment of the molding board, whereby the right end thereof, or that end which is last to engage the loaf, is lower or nearer the apron 97 than the left end, insures the continual engagement of the loaf by the board throughout the travel of the former past the latter as the loaf becomes rolled into smaller compass.

In order to control the shape of the loaf the molding board 131 is preferably made adjustable in form. As shown in Fig. 6, the lateral portions of said board are in the form of separate leaves 139 hinged to the central portion thereof at 140. 141 denotes bars secured to and connecting the ends of the bars 127. 142 denotes adjusting screws passing through threaded openings in said bars 141. The adjusting screws 142 are formed at their lower ends with spherical heads 143 (see Figs. 7 and 8) which are received in sockets 144 in the leaves 139 and held in place therein by slotted plates 145. By properly manipulating the adjusting screws 142 the leaves 139 can be raised into the position shown in full lines in Fig. 6, in order to cause the molding board to form substantially round or cylindrical loaves, or depressed into the position shown in dotted lines in said figure to cause said board to form pointed loaves.

146 denotes an auxiliary molding board supported by a frame consisting of bars 147 and 148 corresponding substantially to the bars 127 and 141 in the supporting frame for the molding board 131. The molding board 146 is preferably provided with hinged leaves (not shown) similar to the leaves 139 of the molding board 131 and controlled as to their position by adjusting screws 149 similar to the adjusting screws 142. The auxiliary molding board is not moved in the same manner as the molding board 131, but is pivoted at its left end, as shown in Figs. 1 and 2, to the machine frame, so that its right end rests by gravity upon the apron 97, as shown in Fig. 1, or upon the loaves thereon, as shown in Fig. 2. To this end the bars 147 are provided at their ends with ears 150 (see Fig. 2) which receive pins 151 by which said molding board frame is pivoted to the main frame. The purpose of the auxiliary molding board is to give a final finish to the loaves after leaving the molding board 131 on the apron 97 by causing said loaves to be further rolled upon said apron as they pass beneath said auxiliary molding board.

The complete operation of the machine is as follows: The raw dough is deposited in the hopper 24 and, by reason of the rollers 34, passes freely downwardly toward the bottom of said hopper without sticking to the walls thereof. The portion of the dough upon the bottom of the hopper is engaged at opposite sides by the aprons 45 and 46 which have previously received coatings of flour from the hoppers 61, and intermittently drawn downwardly thereby upon the apron 63. Engaged at opposite sides by the aprons 63 and 46, the dough is drawn downwardly and toward the right in Fig. 2, being somewhat flattened out upon the apron 63 by the apron 46, and is carried toward and beyond the cutter 73. The movement of the aprons 45, 46 and 63, which is derived from the ratchet wheel 35, is intermittent, and in the interval between the movements of these parts the cutter 73 is moved downwardly and across the apron 63, severing a portion of the dough from the strip on the apron 63, which portion is subsequently delivered by said apron to the apron 97. The movement of the latter apron is continuous, and the masses or sheets of dough thereon are engaged, rolled up, and subsequently released by the primary molding mechanism, as above explained. Thereafter the portions or rolls of dough, moving continuously forward on the apron 97 are carried beneath the molding board 131 and engaged thereby, the movement of this board together with the movement of the apron 97 causing said masses or portions to be further rolled up and shaped into loaves. After passing the molding board 131, the loaves are carried by the apron 97 beneath the auxiliary molding board 146, where they are subjected to further shaping, after which they are delivered from the end of said apron to pans or other receptacles for baking.

The combined and successive operation of the primary and secondary molding mechanisms above described has been found to produce particularly satisfactory results, and both of these mechanisms are preferably employed. If desired, however, and under certain conditions, the secondary molding mechanism might be employed without the primary, and such an arrangement is considered to be within the spirit of the invention. Moreover the auxiliary molding board 146, while desirable, may be dispensed with, particularly when the main molding board 131 is employed, as the loaves may be given a very satisfactory shape by said main molding board.

Other changes in the various parts and mechanisms which separately and collectively constitute the present invention will suggest themselves to those skilled in the art, and such changes are to be considered as within the scope of the invention as defined by the claims hereunto appended.

Having thus described my invention I claim:

1. In a machine of the character described, the combination with a conveyer for carrying masses of dough, of a molding board arranged adjacent said conveyer for engaging said masses of dough in their passage thereby and forming the same into loaves, and means for moving said conveyer and molding board in opposite directions, said molding board being held against movement transversely of said conveyer.

2. In a machine of the character described, the combination with a conveyer for carrying masses of dough, of a molding board arranged adjacent said conveyer for engaging said masses of dough in their passage thereby and forming the same into loaves, and rigid means for positively guiding said molding board in a curved path, said molding board being held against movement transversely of said conveyer.

3. In a machine of the character described, the combination with a conveyer for carrying masses of dough, of a molding board arranged adjacent said conveyer for engaging said masses of dough in their passage thereby and forming the same into loaves, and rigid means for positively guiding said molding board for movement in a direction opposite to the direction of movement of said conveyer, said molding board being held against movement transversely of said conveyer.

4. In a machine of the character described, the combination with a conveyer for carrying masses of dough, of a molding board arranged adjacent said conveyer, and means for oscillating said molding board in an oval path perpendicular to said conveyer, said molding board coöperating with said conveyer to roll said masses of dough into loaves.

5. In a machine of the character described, the combination with a support for a mass of dough, of a molding board arranged adjacent said support, means for reciprocating said molding board vertically toward and from said support and means for simultaneously reciprocating said molding board horizontally.

6. In a machine of the character described, the combination with a support for a mass of dough, of a molding board arranged adjacent said support, a frame by which said molding board is carried, and a vertically movable frame on which said first-named frame is horizontally movable.

7. In a machine of the character described, the combination with a support for a mass of dough, of a molding board arranged adjacent said support, a frame by which said molding board is carried and provided with rollers, and a vertically movable frame having horizontal guideways in which said rollers are mounted.

8. In a machine of the character described, the combination with a support for a mass of dough, of a molding board arranged adjacent said support, a frame by which said molding board is carried, a second frame on which said first-named frame is horizontally movable, slides on which said second frame is mounted, vertical guides for said slides, a yoke connecting said slides, an arm to which said yoke is connected, and a cam for operating said arm.

9. In a machine of the character described, the combination with a support for a mass of dough, a molding board arranged adjacent said support, a frame by which said molding board is carried, a vertically movable frame on which said first-named frame is horizontally movable, a rock shaft operatively connected with said first-named frame for moving the same horizontally, an arm on said rock shaft, a crank, and a link connecting said crank and arm.

10. In a machine of the character described, the combination with a support for a mass of dough, of a molding board arranged adjacent said support, a frame by which said molding board is carried, a second frame on which said first-named frame is horizontally movable, slides on which said second frame is mounted, vertical guides for said slides, a yoke connecting said slides, an arm to which said yoke is connected, a cam for operating said arm, a rock shaft operatively connected with said first-named frame for moving the same horizontally, and a crank and connections for operating said rock shaft.

11. In a machine of the character described, the combination with a conveyer for carrying masses of dough, of a reciprocating molding board arranged adjacent said conveyer and at an inclination thereto for engaging said masses of dough in their passage thereby and forming the same into loaves, and means for adjusting the inclination of said molding board with respect to said conveyer.

12. In a machine of the character described, the combination with a machine frame and a support for a mass of dough, of a molding board arranged adjacent said support, a molding board frame by which said molding board is carried, means for relatively moving said molding board frame and support, and adjusting screws connecting said molding board frame and molding board whereby the position of said molding board may be varied.

13. In a machine of the character described, the combination with a machine frame and a support for a mass of dough, of a molding board arranged adjacent said support, a molding board frame by which said molding board is carried, means for relatively moving said molding board frame and support, and adjusting screws connecting the corners of said molding board frame and the corners of said molding board, whereby the position and inclination of said molding board with respect to said support may be varied.

14. In a machine of the character described, the combination with a support for a mass of dough, of a molding board arranged adjacent said support, a frame by which said molding board is carried, means for relatively moving said frame and support, bars carried by said molding board, other bars secured to said first-named bars and spaced therefrom, and adjusting screws carried by said frame and passing through said last-named bars, said adjusting screws having heads received between said first-named bars and said last-named bars.

15. In a machine of the character described, the combination with a support for a mass of dough, of a molding board arranged adjacent said support, and means for reciprocating said molding board, said molding board being adjustable in form.

16. In a machine of the character described, the combination with a support for a mass of dough, of a molding board arranged adjacent said support, and means for relatively moving said molding board and support, said molding board comprising a central portion and a pair of leaves hinged to the lateral edges of said central portion.

17. In a machine of the character described, the combination with a support for a mass of dough, of a molding board arranged adjacent said support and comprising a central portion and a pair of leaves hinged to said central portion, bars secured to said central portion, adjusting screws connecting said bars and leaves, and means for relatively moving said molding board and support.

18. In a machine of the character described, the combination with a support for a mass of dough, of a molding board arranged adjacent said support and comprising a central portion and a pair of leaves hinged to said central portion, bars secured to said central portion, adjusting screws connecting said bars and leaves, a frame by which said molding board is carried, adjusting screws connecting said frame and molding board whereby the position of said molding board may be varied, and means for relatively moving said frame and support.

19. In a machine of the character described, the combination with a support for a mass of dough, of a molding board arranged adjacent said support and comprising a central portion and a pair of leaves hinged to said central portion, bars secured to said central portion, adjusting screws connecting said bars and leaves and provided with spherical heads, said leaves having recesses in which said heads are received, slotted plates secured to said leaves for retaining said heads in said recesses, and means for relatively moving said molding board and support.

In testimony whereof I affix my signature in presence of two witnesses.

RUDOLPH WOLF.

Witnesses:
S. W. ATHERTON,
H. W. MEADE.